under 35 U.S.C. 154(b) by 43 days.

(12) United States Patent
Richard et al.

(10) Patent No.: US 10,670,458 B2
(45) Date of Patent: Jun. 2, 2020

(54) METHOD FOR ACQUIRING AND FORMING A SPECTROMETRY IMAGE BY ADAPTED SPATIAL SAMPLING

(71) Applicant: HORIBA FRANCE SAS, Longjumeau (FR)

(72) Inventors: Simon Richard, Palaiseau (FR); Sébastien Laden, Bondues (FR); Dmitri Kouznetsov, Palaiseau (FR)

(73) Assignee: HORIBA FRANCE SAS, Longjumeau (FR)

( * ) Notice: Subject to any disclaimer, the term of this patent is extended or adjusted under 35 U.S.C. 154(b) by 43 days.

(21) Appl. No.: 16/091,837

(22) PCT Filed: Apr. 3, 2017

(86) PCT No.: PCT/FR2017/050780
§ 371 (c)(1),
(2) Date: Oct. 5, 2018

(87) PCT Pub. No.: WO2017/174915
PCT Pub. Date: Oct. 12, 2017

(65) Prior Publication Data
US 2019/0086262 A1 Mar. 21, 2019

(30) Foreign Application Priority Data
Apr. 7, 2016 (FR) .................................... 16 53063

(51) Int. Cl.
*G01J 3/28* (2006.01)
*G01J 3/44* (2006.01)
*G01N 21/64* (2006.01)
*G01N 21/65* (2006.01)
(Continued)

(52) U.S. Cl.
CPC .............. *G01J 3/2823* (2013.01); *G01J 3/027* (2013.01); *G01J 3/2803* (2013.01); *G01J 3/44* (2013.01);
(Continued)

(58) Field of Classification Search
CPC ........ G01J 2003/2813; G01J 2003/2826; G01J 3/027; G01J 3/2803; G01J 3/2823;
(Continued)

(56) References Cited

U.S. PATENT DOCUMENTS 6,834,126 B1 * 12/2004 Henry ....................... G06T 3/60
382/276
7,283,684 B1 10/2007 Keenan
(Continued)

FOREIGN PATENT DOCUMENTS

WO WO 2014/147416 9/2014

OTHER PUBLICATIONS

International Search Report, PCT/FR2017/050780, dated Jun. 23, 2017.
(Continued)

*Primary Examiner* — Violeta A Prieto
(74) *Attorney, Agent, or Firm* — Young & Thompson (57) ABSTRACT

Disclosed is a method for acquiring and forming a spectrometry image, including the following steps: a) acquiring an initial structural image of an area of a sample; b) breaking down the initial structural image so as to determine a multi-scale spatial sample of the area of the sample; c) determining a plurality of spectrometry measurement positions in the area of the sample, as a function of the multi-scale spatial sampling determined in step b); d) consecutively, for each spectrometry measurement position determined in step c), positioning the excitation beam and acquiring a spectrometry measurement; and e) reconstructing a spectrometry image point-by-point from the spectrometry measurements acquired in step d).

11 Claims, 6 Drawing Sheets

(51) Int. Cl.
*G06T 3/40* (2006.01)
*G01J 3/02* (2006.01)

(52) U.S. Cl.
CPC ........ *G01J 3/4406* (2013.01); *G01N 21/6458* (2013.01); *G01N 21/65* (2013.01); *G06T 3/4061* (2013.01); *G01J 2003/2813* (2013.01); *G01J 2003/2826* (2013.01)

(58) Field of Classification Search
CPC ........ G01J 3/44; G01J 3/4406; G01N 21/658; G01N 21/65; G06T 3/4061
See application file for complete search history.

(56) References Cited

U.S. PATENT DOCUMENTS

| | | | |
|---|---|---|---|
| 7,400,772 B1* | 7/2008 | Keenan | G06K 9/527 375/240 |
| 7,627,056 B1* | 12/2009 | Harris | H04L 1/004 375/260 |
| 2006/0147097 A1* | 7/2006 | Grangeat | G06T 11/006 382/128 |

OTHER PUBLICATIONS

Valene Perner: "Application de la theorie des ondelettes", Mar. 14, 2015 (Mar. 14, 2015), XP05531294, Retrieved from the Internet: URL:http://www-ljk.imag.fr/membres/Valerie.Perrier/PUBLI/Cours4-VP.pdf [retrieved on Dec. 22, 2016], Tuisia, pp. 1-50.

Maidek Vidal et al: "Pre-processing of hyperspectral images. Essential steps betore image analysis". Chemometrics and Intelligent Laboratory Systems, vol. 117. Aug. 1, 2012 (Aug. 1, 2012). pp. 138-148. XP055331442. NL ISSN: 0169-7439. D0I.

* cited by examiner

METHOD FOR ACQUIRING AND FORMING A SPECTROMETRY IMAGE BY ADAPTED SPATIAL SAMPLING

TECHNICAL FIELD TO WHICH THE INVENTION RELATES

The present invention generally relates to the field of methods and instruments for acquiring a spectral or hyperspectral image of a sample, based on the use of techniques point-by-point measurement of Raman, fluorescence, photoluminescence or cathodoluminescence spectrometry and of point-by-point image reconstruction.

It more particularly relates to a method for acquiring and forming, point by point, a spectral, hyperspectral image or a spectrometric image of a sample.

It relates in particular to a method for rapidly acquiring and reconstructing an image of a sample in Raman microspectrometry, the high spatial resolution image being formed point by point.

TECHNOLOGICAL BACKGROUND

A single-point spectrometry measurement is generally sufficient for analysing a spatially homogeneous sample. However, in the case of a spatially inhomogeneous sample, it is desirable to perform spectrometry measurements in the form of an image constructed point by point with a spatial resolution adapted as a function of the structure or the microstructures of the sample.

Different techniques of spectrometry imaging are known, based on the point-by-point acquisition of spectra and on the reconstruction of a spatially resolved spectrometry image. These systems require a displacement of the sample with respect to the measurement instrument and to an excitation beam focused to one point, or a scanning of the excitation beam with respect to the sample, or also a combination of a beam scanning and a displacement of the sample.

In a system of Raman microspectrometry imaging based on a displacement of the sample, the sample is placed on a plate that is motor-driven or provided with piezoelectric actuators, to displace the sample along two transverse directions (XY). The laser excitation beam is focused to the sample, in an area of about 1 micrometer in diameter. The displacement of the sample generally follows a periodic grid having a constant pitch along X and along Y. A spectrum is acquired at each new position of the sample. A processing software reconstructs a hyperspectral image from this set of measurements.

It is also known from the patent document EP1983332A a method of spectroscopy imaging and a system for scanning exploration of the surface of a fixed sample. The document EP1983332A describes a spectroscopy imaging apparatus comprising a scanning device, also called a scanner, for exploring the surface of a fixed sample by angular displacement of a laser excitation beam along two transverse directions. More precisely, the document EP1983332A describes a scanning device placed in the tube of a confocal microscope so as to be inserted between the microscope lens and the injection-rejection filter of a Raman spectrometer. The scanning device operates in one direction to angularly displace the laser excitation beam so as to position it at different points of the surface of the sample. By reverse return of light, this scanning device operates in the reverse direction to collect a Raman back-scattering beam and to transmit it to a detection system, for example a Raman spectrometer. This apparatus makes it possible to acquire point by point a Raman spectrometry image of a portion of the surface of a sample with a resolution of about 50×50 points within about 10 minutes. A change of magnification of the microscope lens makes it possible to modify the extent of the scanned surface on the sample.

Other patent documents describe beam scanning microspectrometry imaging apparatuses (see for example WO 2010/069987, US 2005/128476 or JP 2001 091848).

Whatever the type of displacement chosen, the duration of point-by-point acquisition of an image is determined by the duration of acquisition of each point and the number of points of the image. The duration of acquisition of each point is linked to the light and to the spectral resolution of each point. The number of points of the image depends on the pitch of displacement of the sample with respect to the excitation beam and of this beam with respect to the sample, which determines the spatial resolution of the image.

The acquisition of a single Raman spectrum generally takes between 0.1 ms and 1 minute, and on average 1 second. To obtain an image with a high spatial and spectral resolution, the duration of acquisition of a Raman microspectrometry image can reach several hours or even several tens of hours. These durations are not adapted for the analysis of several samples.

The main options to reduce the duration of acquisition of spectrometry images are reducing the duration of acquisition of each point and reducing the number of points in one image. However, these options generally lead to a loss of quality of the reconstructed image, a diminution of the signal to noise ratio of each point and/or a diminution of the spatial resolution of the reconstructed image. In certain applications, it is desirable to reduce the duration of acquisition of a microspectrometry image or a hyperspectral image without loss of luminosity, of signal to noise ratio, of spectral resolution nor of spatial resolution in the image reconstructed point by point.

In other applications, it is desirable to increase the spatial resolution of a hyperspectral image or a microspectrometry image without increasing the duration of acquisition of this image.

OBJECT OF THE INVENTION

In order to remedy the above-mentioned drawback of the state of the art, the present invention proposes a method for acquiring and forming point by point a spectrometry image of a sample, the method comprising the following steps:

a) digitally acquiring an initial structural image of an area of the sample, the initial structural image including pixels arranged into lines and columns;

b) digitally processing the initial structural image to decompose said initial structural image into at least one first block of pixels associated with a first spatial sampling pitch and a second block of pixels associated with a second spatial sampling pitch, the first spatial sampling pitch being higher than the second spatial sampling pitch, so as to determine a multi-scale spatial sampling of said area of the sample;

c) determining a plurality of spectrometry measurement positions in said area of the sample, as a function of the multi-scale spatial sampling determined at step b);

d) successively, for each spectrometry measurement position of the plurality of spectrometry measurement positions determined at step c), positioning an excitation beam at a spectrometry measurement position and acquiring a spectrometry measurement for said spectrometry measurement position;

e) reconstructing a spectrometry image point by point, each point of the reconstructed spectrometry image being obtained from one or several spectrometry measurements acquired at step d).

In the present document, it is meant by "image component" or, equivalently, "component", a numerical table, for example in the form of a matrix, comprising one or several numerical values obtained after a digital processing of the initial structure image. The sum of the number of non-null numerical values contained in the totality of the components of order 1 of an image remains lower than or equal to the number of pixels of the initial structural image.

More generally, it is meant by "component of order N", a numerical table, for example in the form of a matrix, comprising one or several numerical values obtained after a digital processing of a component of order N−1. Similarly, the sum of the number of non-null numerical values contained in the totality of the components of order N remains lower than or equal to the sum of the number of non-null numerical values contained in the component of order N−1, from which the components of order N are derived.

The method for processing a structural image of the sample makes it possible to determine the positions on the sample at which performing the single-point measurements, in order to obtain the most appropriate local spatial resolution as a function of the structure of this area of the sample.

Advantageously, step b) comprises a step of decomposing the initial structural image into wavelets, or a step of searching for outlines in the initial structural image or a step of searching for forms in the initial structural image. Preferably, step b) comprises a step b1) of decomposing the initial structural image into wavelets into a first, second, third and fourth components of order 1, each component of order 1 having a number of pixels equal to one quarter of the number of pixels of the initial structure image, the first component of order 1 representing the low spatial frequencies of the initial structural image, the second component of order 1 representing the horizontal variations of the initial structure image, the third component of order 1 representing the vertical variations of the initial structural image, and the fourth component of order 1 representing the diagonal variations of the initial structural image, and a step of filtering the second, and respectively third, fourth, component of order 1 by thresholding the variations, to form a second, and respectively third, fourth, filtered component of order 1, step c) comprises a step c1) of determining a plurality of spectrometry measurement positions in said area of the sample, as a function of the values of the second, third and fourth filtered components of order 1 determined at step b1); and at step e), each point of the reconstructed spectrometry image is obtained by a linear combination of the spectrometry measurements acquired at step d).

According to a particular and advantageous aspect, the method comprises additional steps after step b1) of decomposing the initial structural image into a first, second, third and fourth components of order 1 and before step d) of spectrometry measurement and step e) of reconstruction, wherein steps bN) to cN) are iterated from 2 to N, and wherein steps dN) to eN) are iterated from N to 2, where N represents a natural integer higher than or equal to two and lower than or equal to m for an initial structural image of 2 m×2 m pixels: bN) decomposing the first component of order N−1 into a first, second, third and fourth components of order N, the first component of order N representing the low spatial frequencies of the first component of order N−1, the second component of order N representing the horizontal variations of the first component of order N−1, the third component of order N representing the vertical variations of the first component of order N−1 and the fourth component of order N representing the diagonal variations of the first component of order N−1, and filtering the second, and respectively third, fourth, component of order N by thresholding, to form a second, and respectively third, fourth, filtered component of order N;

cN) determining a plurality of positions of spectrometry measurements of order N in said area of the sample, as a function of the values of the first, second, third and fourth filtered image components of order N;

dN) for each spectrometry measurement position of the plurality of positions of spectrometry measurements of order N determined at step cN), positioning the excitation beam to a position of spectrometry measurement of order N and acquiring a spectrometry measurement for said position of spectrometry measurement of order N;

eN) reconstructing a spectrometry image at order N−1, each point of the spectrometry image reconstructed at order N−1 being obtained by a linear combination of the spectrometry measurements acquired at step dN).

Each spectrometry image reconstructed at order N−1 has hence a maximal local spatial resolution equal to the spatial resolution of the initial image IM0 divided by 4 at power N.

According to another particular and advantageous aspect of the method, at step b1), respectively bN), each pixel of the first component of order 1, respectively of order N, is formed by merging four adjacent pixels of the initial structural image, respectively merging four adjacent pixels of the first component of order N−1, the four adjacent pixels being arranged on two lines and two columns of the initial structural image, respectively of the first component of order N−1.

According to another particular and advantageous aspect of the method, each pixel of the first component of order 1, respectively of order N, has a value equal to one quarter of the sum of the values of four adjacent pixels of the initial structural image, respectively one quarter of the sum of the values of four adjacent pixels of the first component of order N−1, said four adjacent pixels being arranged on two lines and two columns.

Hence, step b), respectively bN), constitutes a step of decomposing the initial structural image, respectively the first component of order N−1, into wavelets.

According to another particular and advantageous aspect of the method, step c), respectively cN), of filtering includes a step of resetting to zero the value of one pixel of said second, respectively third, fourth, component of order 1, respectively of order N, when the value of said pixel is lower than or equal to a predetermined threshold value.

According to another particular and advantageous aspect, the method comprises an additional step f), respectively fN), after step d), respectively dN), and before step e), respectively eN), wherein step f), respectively fN), comprises reconstructing a first, second, third and fourth decomposed spectrometry image of order 1, respectively of order N, said first, second, third and fourth decomposed spectrometry image of order 1, respectively of order N, having a number of points equal to the number of pixels of said first, second, third and fourth filtered decomposed structural image of order 1, respectively of order N, and wherein each pixel of null value of the second, respectively third, fourth, filtered decomposed structural image of order 1, respectively of order N, is associated with a point of null value of the second, respectively third, fourth, decomposed spectrometry image of order 1, respectively of order N, and wherein the values of the other points of the decomposed spectrometry images of order 1, respectively of order N, are calculated for each other point by a linear combination of at most four spectrometry measurements of order 1, respectively of order N, obtained at step d), respectively dN), and wherein step e), respectively eN), of reconstructing the spectrometry image, respectively of order N−1, includes a step of calculating by linear combinations the first, second, third and fourth decomposed spectrometry images of order 1, respectively of order N.

In a particular application to the Raman spectrometry or optical fluorescence or photoluminescence imaging, step d), respectively dN), comprises acquiring Raman or optical fluorescence or photoluminescence spectrometry measurements, by laser beam scanning, and step e), respectively eN), comprises reconstructing a Raman or optical fluorescence or photoluminescence spectrometry image.

In another particular application to the cathodoluminescence imaging, step d), respectively dN), comprises acquiring cathodoluminescence or X-ray fluorescence measurements, by electronic beam scanning, and step e), respectively eN), comprises reconstructing a cathodoluminescence, or respectively an X-ray fluorescence, image.

In another particular application to the X-ray fluorescence imaging, step d), respectively dN), comprises acquiring X-ray fluorescence measurements, by X-ray beam scanning, and step e), respectively eN), comprises reconstructing an X-ray fluorescence image.

According to a particular and advantageous aspect of the method, step a) comprises a step of detecting a structural image of the sample on an image sensor, or a step of recovering an image file of the sample on another metrology instrument or a step of downloading an image file from a data base comprising a structural image of the sample and/or a step of digitizing an analog structural image.

Particularly advantageously, step a) further comprises a step of size increase or decrease, for example by bilinear or bicubic interpolations, so that the size of the resized pixels corresponds to a maximum spatial resolution in the reconstructed spectrometry imaging.

DETAILED DESCRIPTION OF AN EXEMPLARY EMBODIMENT

The following description in relation with the appended drawings, given by way of non-limitative example, will allow a good understanding of what the invention consists of and of how it can be implemented.

DEVICE

Figure 1:
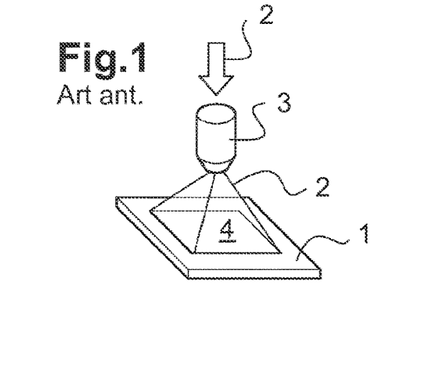
FIG. 1 schematically shows a beam scanning imaging instrument according to the prior art.

In FIG. 1 is schematically shown an example of analysis instrument based on a beam scanning microscope intended to sequentially position an incident beam 2 at different points of a sample 1. Such a scanning microscope includes a scanning device (generally a scanner) for varying the angle of incidence of the incident beam 2 with respect to the sample 1 that remains fixed during the beam scanning. Other microscopes include a moving plate system for displacing the sample with respect to the incident beam that remains fixed. Finally, certain microscopes combine a scanning of the incident beam and a displacement of the sample in order to cover a surface of analysis having a greater spatial extent.

Generally, a microscope for point-by-point spectrometry imaging is configured to perform a relative displacement of an incident excitation beam 2 with respect to the sample 1, so as to sequentially direct the excitation beam to different points of the sample to be analysed.

The analysis instrument also includes a spectrometry device, which makes it possible to acquire a spectrometry signal at each point of the sample excited by the incident beam. The analysis instrument finally includes a calculator and a processing software to form point by point a hyperspectral image or several images of the sample in different spectral bands or at different wavelengths. Each point of the hyperspectral image hence represents a spectrometry measurement, for example a Raman scattering spectrum, a fluorescence spectrum, a photoluminescence spectrum or a cathodoluminescence spectrum.

Figure 2:
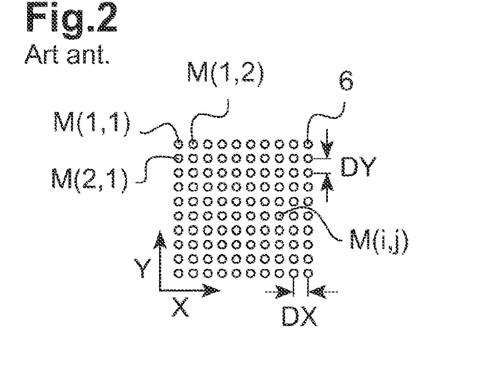
FIG. 2 schematically shows a grid of spatial distribution of measurement points in an XY plane of the sample to form a microspectrometry image reconstructed point by point according to the prior art.

FIG. 2 illustrates a conventional example of grid for beam scanning (represented by discs or measurement spots 6) in a plane (XY) of an orthonormal reference system at the surface of a sample. The displacement generally follows a rectangular or square grid, with a pitch DX along the axis X and a pitch DY along the axis Y. The pitch DX is generally chosen equal to the pitch DY. The incident beam is placed at point M(1, 1) and a first spectrum is acquired at a this first point. Then, the excitation beam is displaced to the point M(1, 2) and a second spectrum is acquired at this second point. The operations of displacement of the beam with respect to the sample and of acquisition of a spectrum are repeated up to obtaining a spectrum for each point M(i, j) of the scanned surface 4 on the sample.

The spatial resolution of the so-obtained image depends on the size of the excitation beam on the sample and on the displacement pitch DX, DY chosen.

The microscope may be an optical microscope including a microscope lens 3 to focus a laser beam 2 to a sample 1 to be analysed. The optical microscope is combined with a Raman or, respectively, optical fluorescence or photoluminescence, spectrometer, configured to measure a Raman scattering spectrum or, respectively, an optical fluorescence or photoluminescence spectrum, in the UV-visible domain.

As an alternative, the microscope may be an X-ray fluorescence microscope, including an X-ray beam focusing and scanning system. The X-ray fluorescence microscope is then combined with a spectrometer configured to measure an X-ray spectrum (XRF).

As an alternative, the microscope may be a scanning electronic microscope (SEM) including an electronic beam focusing and scanning system. The scanning electronic microscope is then combined with a spectrometer configured to measure an X-ray spectrum (EDX), or respectively a cathodoluminescence spectrum.

These analysis instruments make it possible to acquire point by point spectrometry measurements of a sample 1 on a surface 4 scanned with a spatial resolution determined, in particular, by the size of the excitation beam incident on the sample.

The point-by-point spectrometry imaging techniques make it possible to obtain a spatially and spectrally resolved image of a sample. By way of example, the application of the Raman microspectrometry makes it possible to analyse the spatial distribution of chemical composition in an area of a pharmaceutical tablet, with a spatial resolution of the order of $\lambda$, where $\lambda$ represents the wavelength of the excitation beam.

Conventionally, the spatial resolution of a spectral or hyperspectral image obtained with scanning microscopy is spatially uniform over the whole scanned and analysed surface. The duration of acquisition of a scanning microspectrometry image increases as a function of the number of points in the so-formed spectrometry image.

The analysis instrument of the invention further advantageously includes another imaging device making it possible to acquire an initial structural image, of high spatial resolution, of the sample area to be studied. This initial structural image may be a video image acquired by means of a CCD camera combined with the scanning microscope. In a SEM, a secondary electron detector may provide rapidly a high spatial resolution image. Now, certain structural details detected on a high resolution video image, such as, for example, local brightness variations, may be indicative of variations of measurements obtained by spectrometry, although the video image can generally not provide spectrometric information.

Method

Firstly, a structural image of a sample is acquired. By structural image acquisition, it is meant herein either the detection of an image of the sample on an image sensor, for example of the CCD type, or the recovery of an image file of the sample obtained on another metrology instrument or from a database comprising an image of the sample. Preferably, a digital structural image is used. If the structural image detected or collected is analog, it is digitized, so as to obtain an initial structural image of the sample. If necessary, the initial structural image is resized as a function of the area that is desired to be analysed by scanning of the excitation beam and/or by displacement of the sample with respect to the excitation beam.

For example, the structural image detected is a video image obtained by means of a CCD sensor and by lighting the sample with a white light. The settings of the lighting and of the detection system are adjusted so as to increase the image contrast and to highlight the structural details thereof. Advantageously, the intensity, the polarization and/or the lighting and/or detection wavelength are adjusted so as to obtain a strongly contrasted initial structural image.

It is herein meant by "structural image" an image consisted of pixels. The value of each pixel represents for example a reflection or transmission light intensity in the visible, infrared domain, or a circuit map in microelectronic. The value of one pixel is generally not representative, directly or indirectly, of a spectrometry measurement of the sample.

To this initial structural image are then applied successive steps of image processing, possibly iteratively repeated to determine a multi-scale sampling. Preferably, the image processing is based on a method of decomposition into wavelets, compression and filtering.

Alternative methods to the decomposition into wavelets may also be used. By way of example, mention can be made in particular to the image processing methods based on:

contour search by calculations of gradients or derivative of higher orders, such as the Sobel derivative, Laplace operator methods or by available numerical functions such as cvFindContours; or shape search by Hough transform.

These numerical functions are available in the image processing Open Source Library OpenCV. From the contours, it is hence possible to determine areas with a finer sampling pitch.

Figure 3A:
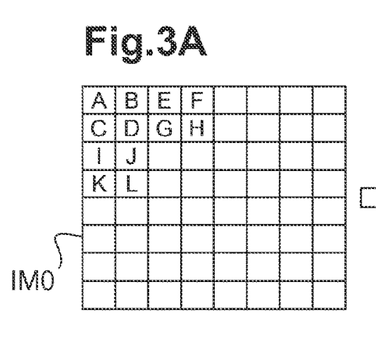
FIG. 3A schematically shows an initial structural image of a sample portion to be analysed with a uniform spatial resolution.
Figure 3B:
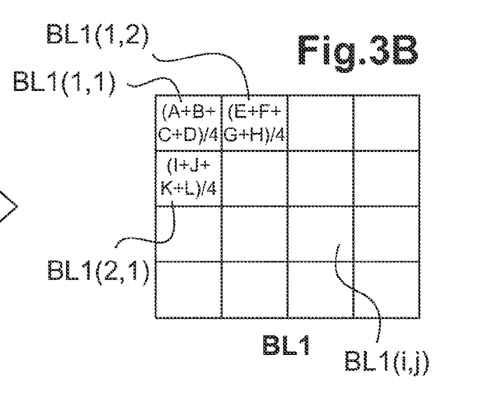
FIG. 3B schematically shows a step of decomposing into wavelets and of calculating a first component BL1 formed by merging blocks of 4 pixels of the initial structural image 3A.
Figure 4:
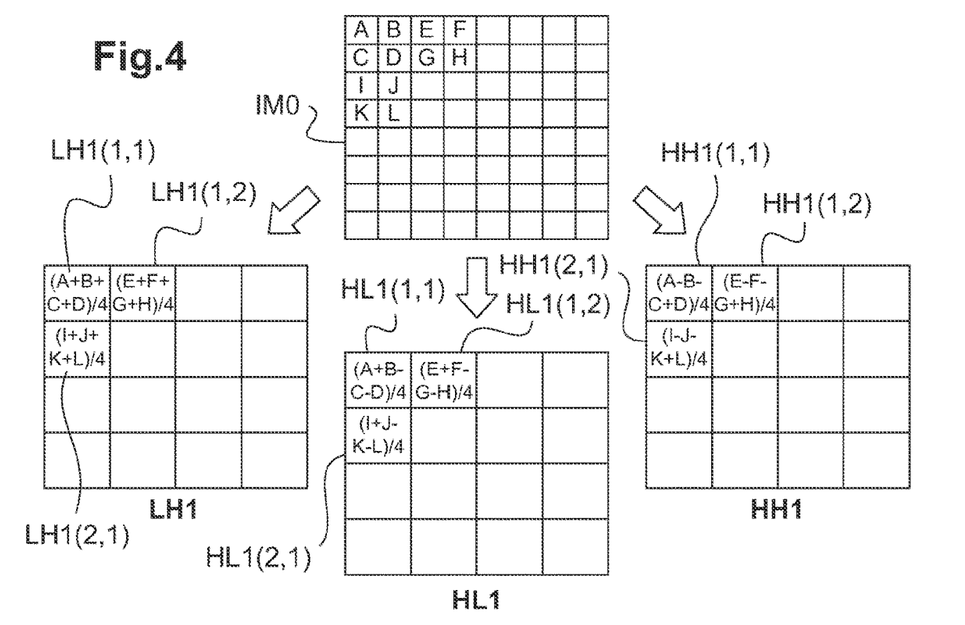
FIG. 4 schematically shows another step of decomposing into wavelets and of calculating, from the initial structural image (IM0), three other components formed by decomposition of the initial structural image following the vertical (HL1), respectively horizontal (LH1) and diagonal (HH1), variations, with a reduced spatial resolution.

FIGS. 3 and 4 illustrate an example of steps of decomposing into wavelets and compressing at order 1 an initial structural image IM0.

FIG. 3 schematically shows a first step of extracting a first component BL1 from the initial structural image IM0, by reducing the spatial resolution in two dimensions. FIG. 3A schematically shows an initial structural image IM0 of the video image type acquired on an area 4 of a sample to be analysed. The value of each pixel of this initial structural image IM0 is herein represented by a letter A, B, C, D, E, F, G, H, I, J, K, L. FIG. 3B schematically shows a first component BL1 calculated from the initial structural image by merging a block of 4 adjacent pixels. The value of the pixel BL1(1, 1) of the first component BL1 corresponds to the average of the values A, B, C, D of 4 adjacent pixels of the initial structural image IM0. Similarly, the value of the pixel BL1(1, 2) of the first component BL1 corresponds to the average of the values E, F, G, H of 4 other adjacent pixels of the initial structural image IM0. Likewise, the value of the pixel BL1(2, 1) of the first component BL1 corresponds to the average of the values I, J, K, L of the 4 other adjacent pixels of the initial structural image IM0. A similar processing is applied to the whole initial structural image IM0 to obtain the component BL1.

$$BL1(1,1)=(A+B+C+D)/4$$

$$BL1(1,2)=(E+F+G+H)/4$$

$$BL1(2,1)=(I+J+K+L)/4$$

More generally, the value of one pixel of coordinates (i, j) in the component
BL1 is defined as follows:

$$BL1(i,j)=\frac{1}{4}\times(IM0(2i-1,2j-1)+IM0)(2i-1,2j)+IM0(2i,2j-1)+IM0(2i,2j))$$

FIG. 4 schematically shows the extraction of three other components from the initial structural image IM0.

The component LH1 represents the horizontal variations of the initial structural image. The value of one pixel of the component LH1 of the horizontal variations is obtained by a column addition and a row subtraction of the values of 4 adjacent pixels of the initial structural image IM0:

$$LH1(1,1)=(A-B+C-D)/4$$

$$LH1(1,2)=(E-F+G-H)/4$$

$$LH1(2,1)=(I-J+K-L)/4$$

More generally, the value of one pixel of coordinates (i, j) in the component LH1 of the horizontal variations is defined as follows:

$$LH1(i,j)=\frac{1}{4}\times(IM0(2i-1,2j-1)-IM0(2i-1,2j)+IM0(2i,2j-1)-IM0(2i,2j))$$

The component HL1 represents the vertical variations of the initial structural image IM0. The value of one pixel of the component HL1 of the vertical variations is obtained by a row addition and a column subtraction of the values of 4 adjacent pixels of the initial structural image IM0:

$$HL1(1,1)=(A+B-C-D)/4$$

$$HL1(1,2)=(E+F-G-H)/4$$

$$HL1(2,1)=(I+J-K-L)/4$$

More generally, the value of one pixel of coordinates (i, j) in the component HL1 of the vertical variations is defined as follows:

$$HL1(i,j)=\frac{1}{4}(IM0(2i-1,2j-1)+IM0(2i-1,2j)-IM0(2i,2j-1)-IM0(2i,2j))$$

The component HH1 represents the diagonal variations of the initial structural image IM0. The value of one pixel of the component HH1 of the diagonal variations is obtained by an addition along one diagonal and a subtraction along the other diagonal of the values of 4 adjacent pixels of the initial structural image IM0:

$$HH1(1,1)=(A-B-C+D)/4$$

$$HH1(1,2)=(E-F-G+H)/4$$

$$HH1(2,1)=(I-J-K+L)/4$$

More generally, the value of one pixel of coordinates (i, j) in the component HL1 of the vertical variations is defined as follows:

$$LL1(i,j)=\frac{1}{4}\times(IM0(2i-1,2j-1)-IM0)(2i-1,2j)-IM0(2i,2j-1)+IM0(2i,2j))$$

The value of any pixel (i, j) of each component (BL1, LH1, HL1, HH1) is hence obtained by a distinct linear combination between the values of 4 adjacent pixels of the initial structural image IM0. The spatial resolution of each component BL1, LH1, HL1, HH1 is hence lower by a factor 4 than that of the initial structural image IM0. For example, if the initial structural image IM0 has a spatial resolution of 512×512 pixels, each component has a spatial resolution of 256×256 pixels.

The high resolution initial structural image IM0 is hence decomposed into 4 components of order 1 (BL1, LH1, HL1, HH1). Each component of order 1 has a spatial resolution reduced by a factor 4 with respect to that of the initial structural image.

At the end of this first decomposition step, 4 components of order 1 are obtained. It is to be noted that the total number of points of the initial structural image 10 is herein equal to the sum of the numbers of points of the four components of order 1.

Figure 5A:
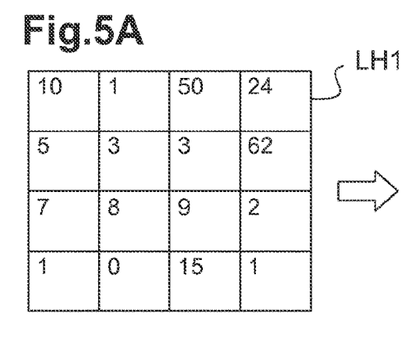
FIG. 5 illustrates an example of thresholding step applied to a component (LH1, FIG. 5A) to form a filtered component (LHF1, FIG. 5B)
Figure 5B:
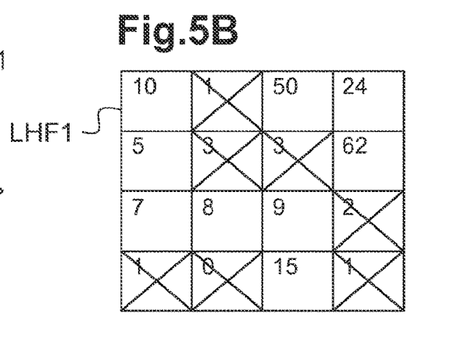

FIG. 5 schematically shows a step of filtering by thresholding applied to a component of spatial variations of order 1, for example LH1, to form a filtered component of order 1, herein LHF1. More precisely, it is shown in FIG. 5A an example of a component of horizontal spatial variations indicating numerical values for each pixel of this component of order 1. A threshold value is determined, for example herein equal to 3. The thresholding operation consists in eliminating the pixels having a value lower than or equal to 3 and in keeping the other pixels having a value higher than 3. In other words, the value of the pixels having a value lower than or equal to the threshold value is cancelled. Hence, in the example shown in FIG. 5B, a filtered spatial frequency component LHF1 is obtained, which contains only 9 pixels of non-null value due to the fact that 7 pixels have been eliminated (represented by crosses in FIG. 5B) and that the component of spatial variations LH1 had 16 pixels.

Similarly, a thresholding operation is applied to the component of vertical spatial variations of order 1, HL1, to obtain a compressed component of filtered vertical spatial variations of order 1 HLF1. Likewise, a thresholding operation is applied to the component of diagonal spatial variations of order 1 HH1 to obtain a component of filtered diagonal spatial variations of order 1 HHF1. The threshold value applied to each component of order 1 HL1, LH1, HH1 may be identical or, on the contrary, adapted as a function each type of image. Preferably, the threshold value(s) are determined so as to eliminate a relatively high number of points corresponding to relatively low spatial variations in order to keep only the image pixels corresponding to relatively high spatial variations. The components of filtered spatial frequencies of order 1 LHF1, HLF1 and HHF1 have lost spatial information of low amplitude variations, but keep the spatial information of the high amplitude variations, and more precisely above the filtering threshold applied. The low frequency spatial information is nevertheless present in the merged component of order 1 BL1.

This operation of filtering of the variations aims to preserve the highest spatial resolution of the points of the image that correspond to variations in the initial structural image that may be associated with local variations in the physico-chemical composition of the sample and to process the pixels associated with low spatial frequencies at a lower spatial resolution.

Figure 6A:
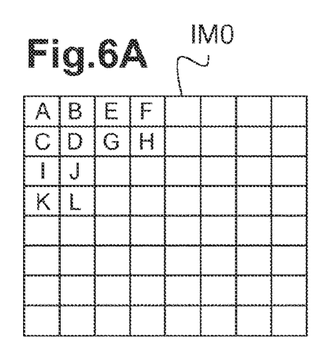
FIG. 6 summarizes the calculation steps illustrated in FIGS. 4 and 5 and shows the transformation of an initial structural image of high spatial resolution into a set of components of reduced spatial resolution: a component BL1 formed by merging; a filtered component of the vertical variations (HLF1), respectively filtered component of the horizontal variations (LJ), and a filtered component of the diagonal variations (HH)
Figure 6B:
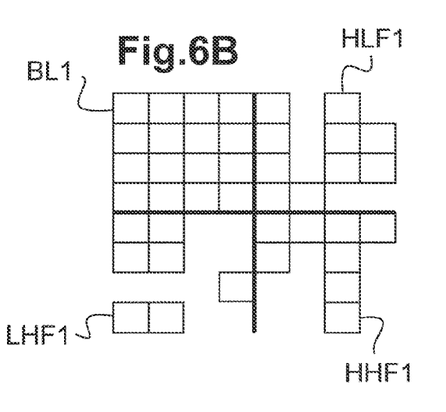

The method of decomposition and filtering of order 1 is summarized in FIG. 6, which represents in FIG. 6A an initial structural image IM0 and in FIG. 6B a first component of order 1 BL1, a second component of filtered horizontal spatial variations of order 1 HLF1, a third component of filtered vertical spatial variations of order 1 LHLF1 and a fourth component of filtered diagonal spatial variations of order 1 HHF1.

The operations of decomposition and compression may be recursively repeated, to obtain a decomposition of the initial structural image of order 1, 2 or 3. The operations of thresholding of the compressed images decomposed into spatial frequencies are then applied after each step of decomposition of order 1, respectively of order 2, and of order 3.

A step of decomposition of order 2 may be applied to the first component BL1 calculated from the initial structural image IM0 by merging of 4 adjacent pixels. In this second step, the first component of order 1 BL1 is decomposed into four components of order 2: BL2, LH2, HL2, HH2. The merged component of order 2 BL2 is obtained by merging of 4 adjacent pixels of the merged component of order 1 BL1. The value of one pixel of the merged component of order 2 BL2 corresponds to the average of the values of 4 adjacent pixels of the first component of order 1.

The component of order 2 LH2 represents the horizontal variations of the first component BL1 of order 1. The value of one pixel of the component of the horizontal variations of order 2 LH2 is obtained by a column addition and a row subtraction of the values of 4 adjacent pixels of the first component of order 1 BL1, obtained by merging.

The component of order 2 HL2 represents the vertical variations of the first component of order 1 BL1. The value of one pixel of the component of order 2 of the vertical variations, HL2, is obtained by a row addition and a column subtraction of the values of 4 adjacent pixels of the first component of order 1 BL1.

The component of order 2 HH2 represents the diagonal variations of the first component of order 1 BL1. The value of one pixel of the component of order 2 of the diagonal variations, HL2, is obtained by an addition along one diagonal and a subtraction along the other diagonal of the values of 4 adjacent pixels of the first component of order 1 BL1.

Each component of order 2 (BL2, LH2, HL2, HH2) has a spatial resolution reduced by a factor 4 with respect to that of the first component of order 1 BL1, or by a factor 16 with respect to the initial structural image IM0. The components of order 2 LH2, HL2, HH2 are then filtered by thresholding, to form filtered components of order 2 LHF2, HLF2, HHF2.

Figure 7:
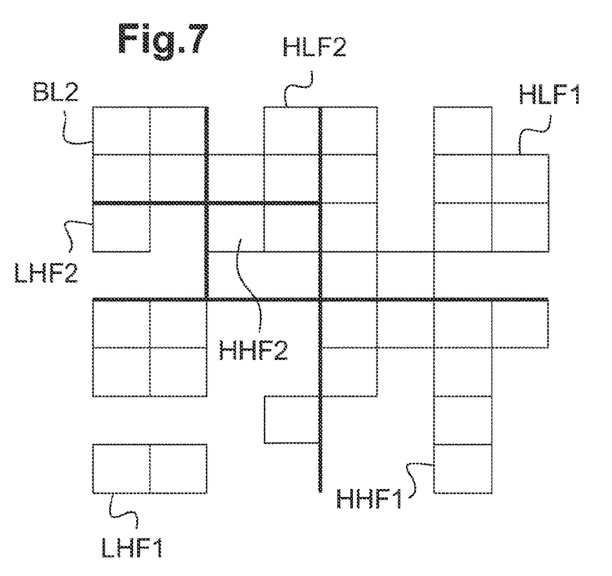
FIG. 7 shows the result of the transformation of an initial structural image of high spatial resolution into a set of components of order 1 (HLF1, LHF1, HHF1) and of components of order 2 (BL2, HLF2, LHF2, HHF2), the components of order 2 (BL2, HLF2, LHF2, HHF2) being obtained by applying to the first component of order 1 (BL1) calculation steps similar to those of FIG. 6, these components of order 2 having a doubly reduced spatial resolution.

FIG. 7 hence illustrates an example of decomposition and filtering at order 2 of an initial structural image IM0 into a set consisted of four components of order 2 (BL2, LHF2, HLF2, HHF2) and three components of order 1 (HLF1, LHF1, HHF1), representing the spatial variations of the initial structural image. The decomposition and filtering of the initial structural image may be continued in particular at order 3, by decomposing the first component of order 2 BL2 into four images obtained similarly to the above-described steps: a first component of order 3 BL3 obtained by merging; and three other components of order 3 (HLF3, LFH3, HHF3) representing the horizontal, vertical and diagonal spatial variations, respectively, of the first component of order 2 BL2.

This method hence makes it possible to obtain a decomposed and filtered image, as illustrated in FIG. 7. This decomposed and filtered image includes less pixels of non-null value than the initial structural image, because the value of some pixels has been cancelled out by thresholding.

As known, it is possible to calculate a digital image by reconstruction from decomposed and filtered images.

More specifically, the decomposition and filtering method herein makes it possible to determine the spatial coordinates of a plurality of points on the sample at which to perform the spectrometry measurements corresponding to the components BL, HLF, LHF and HHF of order 1 and, as the case may be, to the components of orders 2, 3, 4.

The following of the processing is applied to the spectrometry measurements and no longer to the structured image of the sample. Conventionally, point-by-point spectrometry imaging consists in performing measurements by positioning the excitation beam according to a square or rectangular displacement grid, with a constant pitch along X and along Y (see FIGS. 1-2). The values of the pitches along X and along Y are chosen on a case-by-case basis by the user, and have no direct link with the size of the pixels of the initial structural image. On the contrary, according to the present disclosure, points are selected for the spectrometry measurements so as to acquire directly points corresponding to the non-null pixels of the filtered components of the decomposed initial structural image.

Figure 11:
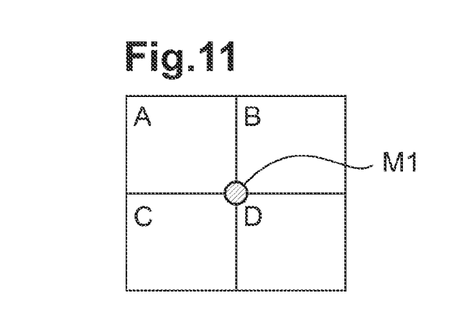
FIG. 11 illustrates a position of an excitation beam for a microspectrometry measurement averaged on four adjacent areas arranged on two lines and two columns.

Let's suppose that we have a decomposed and filtered image as illustrated in FIG. 6B. The spectrometry measurement corresponding to image BL1 is performed by performing 16 points of spectrometry measurement distributed over the whole surface 4 to be analysed of the sample 1. These spectrometry measurements may be made with an incident excitation beam having a relatively large diameter on the sample, because it may cover a surface extending up to 4 pixels of the initial structural image. For that purpose, a macroscopy lens may for example be used in Raman spectrometry. The value of the point BL(1, 1), such as $$BL(1, 1) = \frac{(A + B + C + D)}{4},$$

is hence easily obtained with a single measurement. As an alternative (see FIG. 11), an incident beam of constant diameter is used, for example by using a microscope lens, but the incident beam is positioned at a point of the sample corresponding to the middle of the 4 adjacent pixels A, B, C, D of the initial structural image to obtain a central point of measurement that is an approximation of $$BL(1, 1) = \frac{(A + B + C + D)}{4}.$$

The measurements of the other components of spatial variations, HL, LH, HH, may be obtained from one or several measurements and by different linear combinations. These measurements may depend on the level of decomposition (a single level of decomposition, as illustrated in FIG. 6B, or several levels of decomposition as illustrated in FIG. 7), as well as on the values of the low spatial frequency component BL and on the components of spatial variations HL, LH, HH, also called components of the details.

It is then searched to perform measurements corresponding to the non-null values of the decomposed and filtered images. However, the relation between the values of the decomposed and filtered images and the physical coordinates of the points at which to perform the measurements is not direct. More precisely, it is searched to perform a limited number of measurements, to limit the total duration of acquisition. It ensues from the present disclosure that the physical coordinates of the measurement points depend on the values of the pixels of the decomposed and filtered structural images HLF, LHF, HHF.

Figure 8:
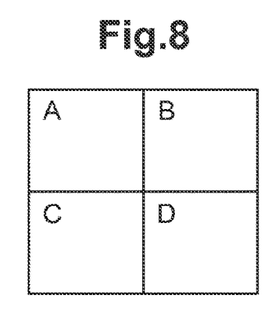
FIG. 8 illustrates a measurement grid following the initial resolution pitch in a plane of the sample.

By way of example, an area of the sample (illustrated in FIG. 8) corresponding, in the initial structural image, to 4 adjacent pixels, is considered.

In the following of the description of the spectrometry measurement acquisition, the variables A, B, C, D represent the values or spectral functions searched at 4 adjacent points, respectively, of the sample.

In FIGS. 9-18 are represented different positions of the spectrometry measurement spot 6 determined to obtain different compressed spectrometry images by means of a limited number of spectrometry measurements and by operations based on linear combinations of these single-point spectrometry measurements.

After analysis of the initial structural image, all the required multi-scale measurement positions are known. However, successive scanning operations are performed, each scanning corresponding to the spectrometry measurements required for reconstructing a scale level.

Hence, a first beam scanning is performed on the area 4 of the sample to be analysed for spectrometry measurements at the lowest spatial resolution. The spatial resolution corresponding to the highest level of decomposition, i.e. corresponding to pixels of large size, is selected.

Figure 9:
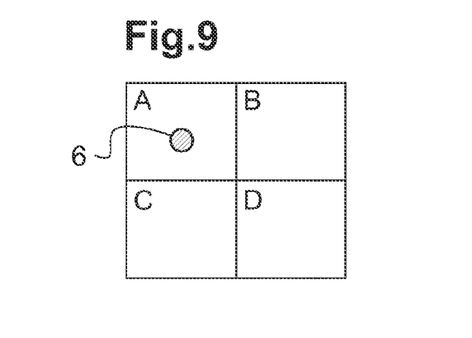
FIG. 9 illustrates the position of an excitation beam for a microspectrometry measurement in the area A with the initial spatial resolution.

In FIG. 9, the position of the spot 6 allows measuring directly one point and obtaining the acquisition of the spectrum A, in other words a spectrometry measurement, herein M1=A.

Figure 10:
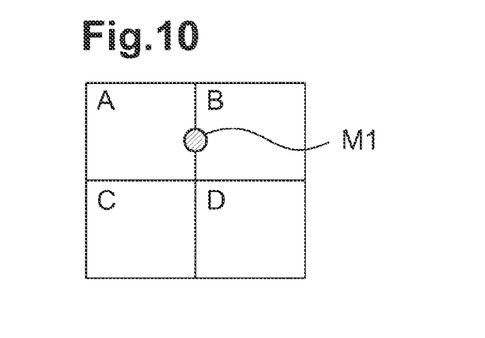
FIG. 10 illustrates a position of an excitation beam for a microspectrometry measurement averaged on two adjacent areas A, B of a same line.

In FIG. 10, the measurement spot is placed between two adjacent points of a same row, which makes it possible to acquire directly a spectrometry measurement corresponding to an average, herein M1=(A+B)/2.

Let's first consider the case where the decomposition of a block of 4 pixels ABCD generates components of variations, all of null value (HL, LH, HH), at a point (i, j) of each component HL, LH, HH, at a given order, i.e. where A≈B≈C≈D. In this case, a single measurement M1 is sufficient. For example, as illustrated in FIG. 11, the measurement spot 6 is placed between four adjacent pixels arranged as a square on two rows and two columns. The measurement spot 6 may have the smallest size defined by the incident beam or have a size greater than that of one pixel. The measurement spot 6 covers at the maximum the surface of the four adjacent pixels. M1=A=B=C=D is hence directly acquired by a single measurement.

Figure 12:
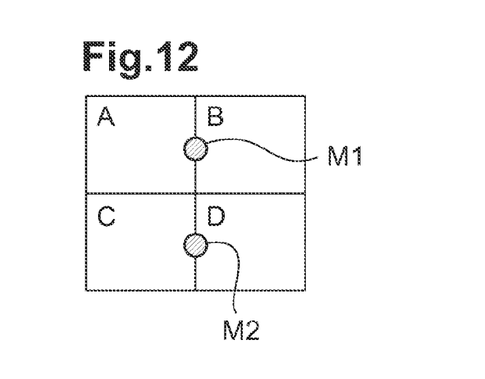
FIG. 12 illustrates two positions of an excitation beam for two microspectrometry measurements each averaged on two adjacent areas of a same line A, B, respectively C, D.

Let's now consider the case where the decomposition of a block of 4 pixels ABCD generates only two component of null variations, at a given order. In this case, two measurements M1, M2 are necessary and sufficient. In FIG. 12 is considered the case where only the components of vertical variations HL are non-null, i.e. where A≈B and C≈D, the other components of horizontal and diagonal variations being null at this order. In this case, the measurement spot 6 is placed between two adjacent pixels of a first row for a first measurement M1, then the measurement spot 6 is placed between two adjacent pixels of a second row adjacent to the first row for a second measurement M2. Hence, M1=A=B is directly acquired at the first measurement and M2=C=D is directly acquired at the second measurement. In this case, on the one hand, the first component at the low spatial frequencies BL=(M1+M2)/2 and, on the other hand, the component of vertical variations HL=(M1−M2)/2, are calculated by simple operations of addition and subtraction.

Figure 13:
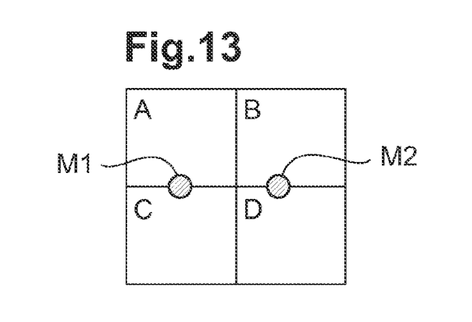
FIG. 13 illustrates two positions of an excitation beam for two microspectrometry measurements each averaged on two adjacent areas A, C of a first column, respectively two adjacent areas B, D of a second column.

In FIG. 13 is considered the case where the decomposition of a block of 4 pixels ABCD generates only one non-null component of horizontal variations LH, i.e. where A≈C and B≈D, the other components of vertical and diagonal variations being null at this order. In this case, the measurement spot 6 is placed between two adjacent pixels of a first column for a first measurement M1, then the measurement spot 6 is placed, for a second measurement M2, between two adjacent pixels of a second column adjacent to the first column. Hence, M1=A=C is directly acquired at the first measurement and M2=B=D is directly acquired at the second measurement. In this case, on the one hand, the first component at the low spatial frequencies BL=(M1+M2)/2 and, on the other hand, the component of horizontal variations LH=(M1−M2)/2, are calculated by simple operations of addition and subtraction.

Figure 14:
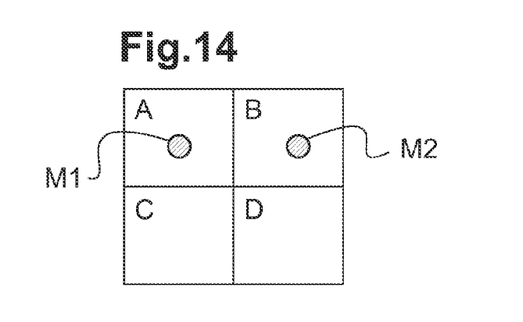
FIG. 14 illustrates the positions of an excitation beam for a microspectrometry measurement in two adjacent areas A, B arranged on a same line with the initial spatial resolution.

In FIG. 14 is considered the case where the decomposition of a block of 4 pixels ABCD generates only one non-null component of diagonal variations, i.e. where A+C≈B+D, A+B≈C+D or A−B≈D−C, in other words A≈D and B≈C, the other components of horizontal and vertical variations being null at this order. In this case, the measurement spot 6 is placed on the pixel A for a first measurement M1, then on the pixel B for a second measurement M2. Hence, M1=1 is directly acquired at the first measurement, respectively M2=B is directly acquired at the second measurement. In this case, it is simply deduced, on the one hand, A=D=M1 and, on the other hand, B=C=M2.

Let's now consider the case where a single component of variations is null. In this case, three spectrometry measurements are necessary.

Figure 15:
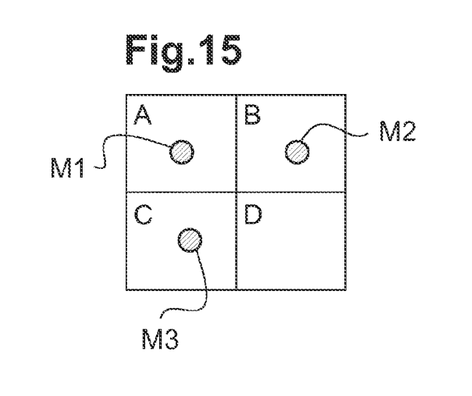
FIG. 15 illustrates the positions of an excitation beam for a microspectrometry measurement in three adjacent areas A, B, C with the initial spatial resolution.

In FIG. 15, the measurement spot 6 is placed on the pixel A for a first measurement M1, then on the pixel B for a second measurement M2, and finally on the pixel C for a third measurement M3. Hence, M1=A is directly acquired at the first measurement, respectively M2=B is directly acquired at the second measurement, respectively M3=C is directly acquired at the third measurement. A first case is considered, in which the components of diagonal variations are null, i.e. where A+D≈B+C, in other words D≈B+C−A. In this first case, D=(M2+M3−M1) is calculated by simple operations of addition and subtraction. Still in connexion with FIG. 15, a second case is considered, in which only the components of horizontal variations LH are null, i.e. where A+C≈B+D, in other words D≈A−B+C. In this second case, the value of D is calculated as follows: D=(M1−M2+M3). Still in connection with FIG. 15, a third case is considered, in which only the components of vertical variations HL are null, i.e. where A+B≈C+D, in other words D≈A+B−C. In this second case, the value of D is calculated as follows: D=(M1+M2−M3).

Let's now consider the case where no component of variations is null. In this case, four spectrometry measurements are required.

Figure 16:
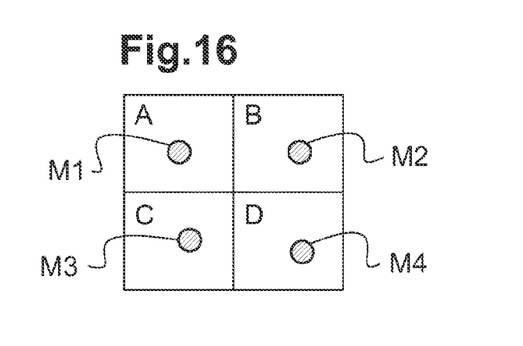
FIG. 16 illustrates the positions of an excitation beam for a microspectrometry measurement in four adjacent areas A, B, C, D with the initial spatial resolution.

In FIG. 16 is considered the case where no component (BL, LH, HL, HH) is null at a given order. In this case, it is necessary to acquire the four measurement points. The measurement spot 6 is placed on the pixel A for a first measurement M1, then on the pixel B for a second measurement M2, on the pixel C for a third measurement M3, and finally on the pixel D for a fourth measurement M4. Hence, four measurements are acquired: A=M1, B=M2, C=M3, D=M4.

As a function of the values of the decomposed images, these spectrometry measurements are repeated for each level of decomposition, in other words at each order, starting from the lowest spatial resolution up to the highest spatial resolution.

In the case of a multi-level compression, a new scanning is firstly performed for acquiring spectrometry measurements according to the components LH, HL and HH corresponding to a higher spatial resolution, in other words to smaller pixels. More precisely, each pixel of the preceding scanning is divided into four adjacent pixels arranged on two rows and two columns.

Generally, for this secondary level of scanning, in the case where all the components of variations are null, in other words A≈B≈C≈D (see FIG. 8), BL is equal to the value of a corresponding pixel of the image reconstructed at the preceding step and it is not necessary to perform a measurement of BL. On the other hand, when the measurement beam is far smaller than the size of the pixels, which is frequent, the same method as for the first scanning is repeated. That is to say that if one of the components HL, LH or HH is non-null, the already obtained value BL is not taken into account.

In the case where only the component HL at this level of decomposition is non-null, in other words A B and C D, the measurement spot is placed between two adjacent pixels of a same row to acquire a measurement M1 (as illustrated in FIG. 10). It is deduced therefrom that A=B=M1 and C=D=2·BL−M1.

Figure 18:
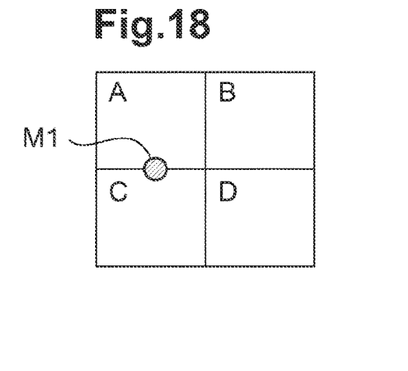
FIG. 18 illustrates a position of an excitation beam for a microspectrometry measurement averaged on two adjacent areas A, C of a same column.

In the case where only the component LH at this level of decomposition is non-null, in other words A C and B D, the measurement spot is placed between two adjacent pixels of a same column to acquire a measurement M1 (as illustrated in FIG. 18). It is deduced therefrom that A=C=M1 and B=D=2·BL−M1.

Figure 17:
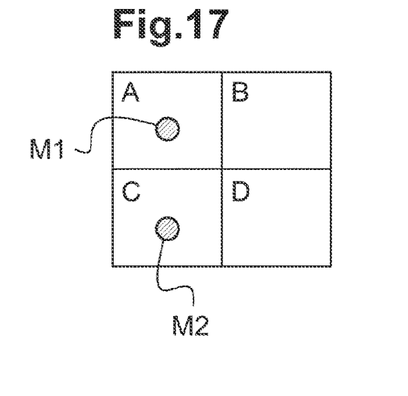
FIG. 17 illustrates the positions of an excitation beam for a microspectrometry measurement in two adjacent areas A, C arranged on a same column with the initial spatial resolution.

In the case where only the components HL and LH at this level of decomposition are non-null, in other words A+D≈B+C, i.e. D≈B+C−A, the measurement spot is placed on the pixel A for a first measurement M1, then on the pixel C for a second measurement M2 (as illustrated in FIG. 17). A=M1 and C=M2 are hence directly acquired. Then, B=2·BL−M2 and D=2·BL−M1 are calculated.

In the case where only the components LH and HH at this level of decomposition are non-null, in other words A+B≈C+D, i.e. D≈A+B−C, the measurement spot is placed on the pixel A for a first measurement M1, then on the pixel C for a second measurement M2 (as illustrated in FIG. 17). A=M1 and C=M2 are hence directly acquired. Then, B=2·BL−M1 and D=2·BL−M2 are calculated.

In the case where only the components HL and HH at this level of decomposition are non-null, in other words A+C≈B+D, i.e. D≈−A+C−B, the measurement spot is placed on the pixel A for a first measurement M1, then on the pixel C for a second measurement M2 (as illustrated in FIG. 14). A=M1 and C=M2 are hence directly acquired. Then, C=2·BL−M1 and D=2·BL−M2 are calculated.

In the case where, at this level of decomposition, only the component HH is non-null, in other words A+C≈B+D, or A+B≈C+D, or A−B≈D−C, the measurement spot is placed on the pixel A for a single measurement M1 (as illustrated in FIG. 9). A=D=M1 is hence directly acquired. Then, B=C=2·BL−M1 is calculated.

In the case where, at this secondary level of decomposition, no component is null, the measurement spot 6 is placed on the pixel A for a first measurement M1, then on the pixel B for a second measurement M2, and on the pixel C for a third measurement M3 (as illustrated in FIG. 15). M1=A is hence directly acquired at the first measurement, respectively M2=B is directly acquired at the second measurement, respectively M3=C is directly acquired at the third measurement. Then, D=4·BL−M1−M2−M3 is calculated.

The spectrometry measurements are reiterated in the same way for the potential following level(s) of decomposition with a spatial resolution four times higher at each level, up to reaching the maximum level having the resolution of the structural image that have served for the decomposition. During the acquisition, the decomposition levels are raised up, and the resolution of the initial structural image is hence obtained naturally, without possible ambiguity.

The positions of the spectrometry measurement points to be performed are hence determined as a function of the components of low spatial frequency and of variations of the decomposed structural images.

The total number of measurements is lower than that of a conventional scanning at the highest spatial resolution because all the null components are directly replaced by zeros and not measured.

The number of spectrometry measurements required to obtain a set of decomposed spectrometry images is determined. The compression rate is defined as the ratio of the number of spectrometry measurements on the total number of pixels of the high resolution spectrometry image.

In practice, a compression rate of 3 to 4 is obtained for one level of compression, of the order of 8 to 15 for two levels of compression and of the order 15 to 30 for three levels of compression. In other words, not including the time for calculating linear combinations, which is not in any way limitative, the duration of acquisition of an image is hence approximately reduced by the compression rate.

It is obtained, based on a limited number of spectrometry measurements, a set of spectrometry images decomposed according to one or several levels.

The following step consists in reconstructing point by point a spectrometry image of the sample area based on these decomposed spectrometry images.

Figure 19:
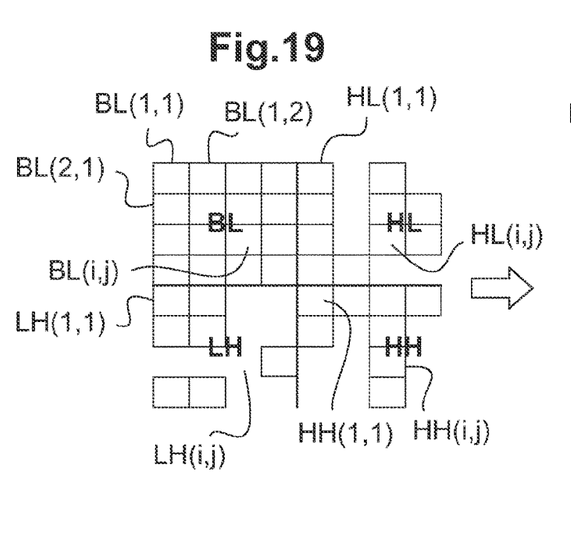
FIGS. 19-20 illustrate a step of reconstruction of a microspectrometry image (FIG. 20) from a set of measurements performed according to a set of one-level spectrometry components (FIG. 19)
Figure 20:
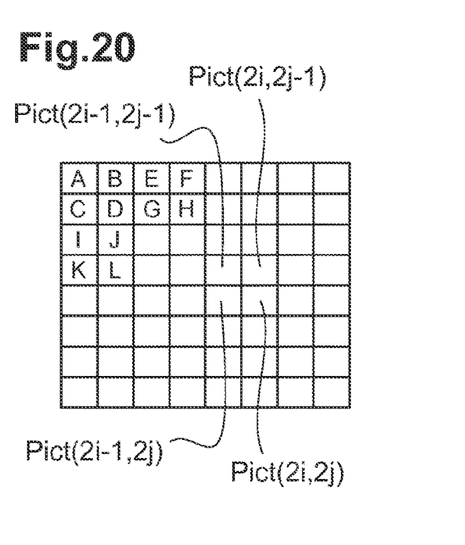

Based on the spectrometry measurements according to the components BL, LH, HL and HH so acquired and calculated at one level of decomposition (FIG. 19), a point-by-point reconstruction is then performed to calculate and display a high resolution hyperspectral image Pict (FIG. 20).

More precisely, a point located on one line i and one column j of each decomposed spectrometry image: BL(i, j), HL(i, j), LH(i, j) and HH(i, j) is considered. The missing values in the decomposed images of the details HL, LH and HH are all replaced by zeros.

Then, based on the four measurements BL(i, j), HL(i, j), LH(i, j) and HH(i, j) of the decomposed images, the values of four reconstructed points in the spectrometry image Pict are calculated by applying the following equations:

$$Pict(2i-1,2j-1)=BL(i,j)+HL(i,j)+LH(i,j)+HH(i,j)$$

$$Pict(2i-1,2j)=BL(i,j)+HL(i,j)-LH(i,j)-HH(i,j)$$

$$Pict(2i,2j-1)=BL(i,j)-HL(i,j)+LH(i,j)-HH(i,j)$$

$$Pict(2i,2j)=BL(i,j)-HL(i,j)-LH(i,j)+HH(i,j)$$

The reconstructed image Pict has herein a spatial resolution four times higher than that of the low frequency compressed spectrometry image.

Advantageously, the reconstruction operations are based only on unweighted arithmetic linear combinations. The reconstruction calculations are hence very rapid.

Figure 21:
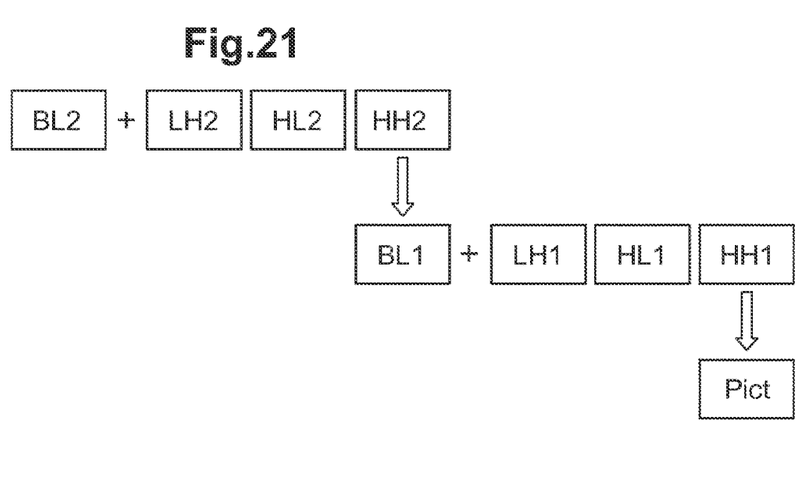
FIG. 21 schematically shows the principle of multi-level reconstruction to obtain a spectrometry image with a multi-scale spatial resolution.

In the case where the image is decomposed and compressed over several levels, the multi-level reconstruction is performed in a pyramidal way, as illustrated in FIG. 21. Firstly, the components of order 2 BL2, HL2, LH2 and HH2 are acquired. Using this set, the first component of order 1 BL1 is reconstructed, and the other components of order 1 are acquired, and from the other components of order 1 HL1, HL1, HH1, the multi-scale spectrometry image Pict is reconstructed.

The present disclosure makes it possible to perform the acquisition and the reconstruction of a high resolution spectrometry image with a reduced duration of acquisition compared to a point-by-point acquisition of a spectrometry image according to a spatial sampling with a single and constant pitch over the whole image.

Figure 22:
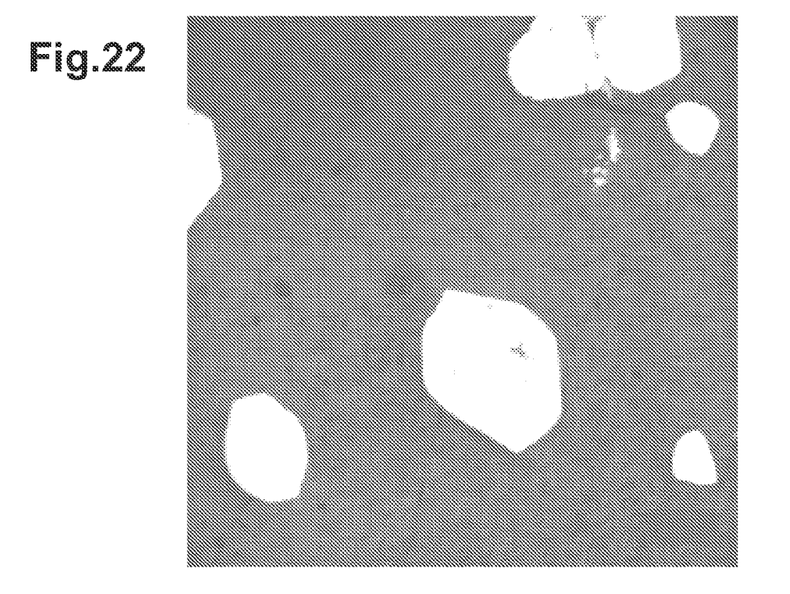
FIG. 22 illustrates an example of initial structural image of a sample portion to be analysed, with an initial spatial resolution.

FIG. 22 illustrates an experimental example of a video image of an area of a sample to be analysed. The initial structural image of FIG. 22 comprises 472×472 pixels, these pixels all having the same size. On this original image, particles of variable size and shape, distributed over a relatively uniform background, can be observed.

FIG. 22 is digitized, decomposed into components BL, HL, LH, HH up to level 3. Hence, decomposed images of order 1 BL1, HL1, LH1, HH1 each having 236×236 pixels are formed. Based on BL1, compressed images of order 2 BL2, HL2, LH2, HH2 each having 118×118 pixels are formed. Finally, based on BL2, compressed images of order 3 BL3, HL3, LH3, HH3 each having 59×59 pixels are formed. The decomposed images of the variations HL, LH, HH, for the levels of decomposition N=1, 2, 3 are filtered so as to suppress the low variations and to replace them by null values, hence forming filtered decomposed images. From the decomposed (BL) and filtered (HL, LH, HH) structural images is deduced a plurality of positions of measurement points at each level of decomposition.

Figure 23:
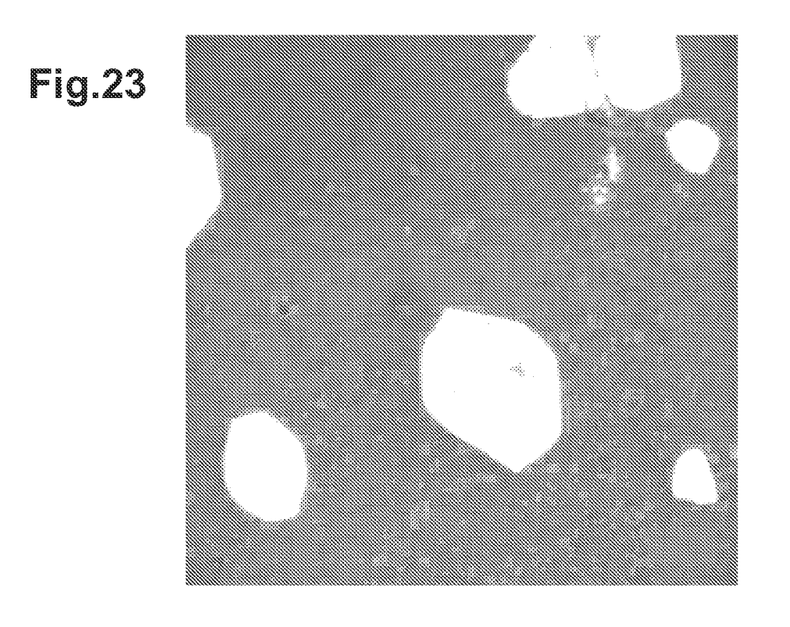
FIG. 23 illustrates the result of a method applied to the video image of FIG. 22 and comprising several steps of decomposition and filtering, then several steps of reconstruction to form a reconstructed structural image highlighting the multi-scale acquisition areas, with a multiple sampling pitch, the sampling being refined in the variation areas of the image.

The image of FIG. 23 represents the initial structural image on which have been superimposed, in another colour, the areas in which details remain present after filtering. Hence, FIG. 23 highlights the areas of the sample in which the variations after filtering are non-null for one or several orders of decomposition.

Figure 24:
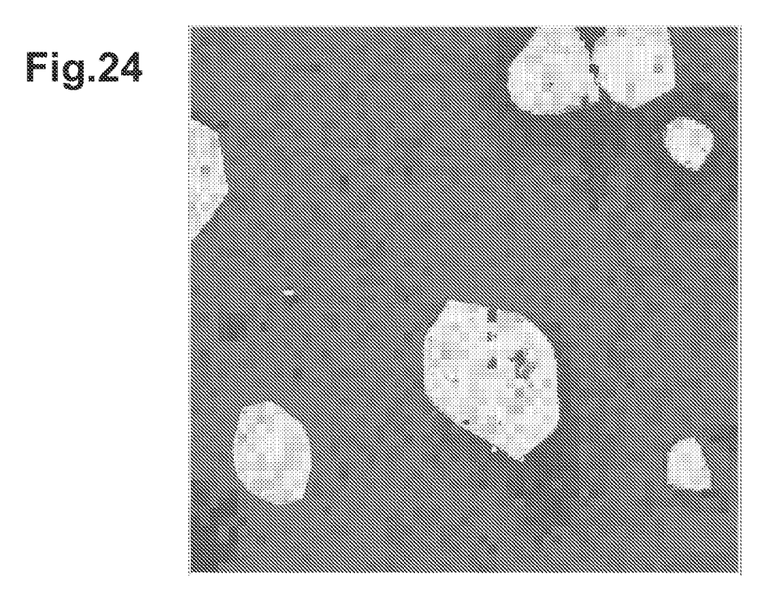
FIG. 24 illustrates a Raman microspectrometry image of multi-scale spatial resolution reconstructed point by point, obtained by applying the method of the invention, with a compression factor of the order of 20, i.e. obtained with 20 times less measurements than an image fully measured with the finest resolution of the multi-scale image.

FIG. 24 represents the reconstructed Raman microspectrometry image, by applying the processing illustrated in FIG. 22 to Raman spectrometry measurements acquired at the points determined by the decomposition and filtering algorithm, then by reconstructing point by point the microspectrometry image from the measurements performed. In this example, a compression factor of the order of 20 is obtained.

In other words, instead of acquiring 472×472 Raman spectra, only 472×472/20 Raman spectra are acquired. This compression factor translates into a reduction of the duration of acquisition also of a factor 20. Hence, the duration of acquisition of a Raman spectrometry image estimated in this example to 240 h for an image of 472×472 points is herein brought back to 12 h.

In the areas of the sample that have structural details, the method of the invention makes it possible to apply locally the highest spatial resolution. On the reverse, in the relatively uniform areas of the sample, an acquisition at a lower spatial resolution is applied. Hence, a multi-scale Raman multispectrometry image is hence obtained. In the areas of low spatial resolution of the reconstructed microspectrometry image, it is hence easily possible to perform a digital interpolation to obtain a spectrometry image with a uniform grain.

The invention claimed is:

1. A method for acquiring and forming a spectrometry image (Pict) of a sample (1), comprising the following steps:
   a) digitally acquiring an initial structural image (IM0) of an area (4) of the sample (1), the initial structural image (IM0) including pixels arranged into lines and columns;
   b) digitally processing the initial structural image (IM0) to decompose said initial structural image (IM0) into at least one first block of pixels associated with a first spatial sampling pitch and a second block of pixels associated with a second spatial sampling pitch, the first spatial sampling pitch being higher than the second spatial sampling pitch, so as to determine a multi-scale spatial sampling of said area (4) of the sample (1);
   c) determining a plurality of spectrometry measurement positions (Xi, Yj) in said area (4) of the sample, as a function of the multi-scale spatial sampling determined at step b);
   d) successively, for each spectrometry measurement position (Xi, Yj) of the plurality of spectrometry measurement positions determined at step c), positioning an excitation beam at a spectrometry measurement position (Xi, Yj) and acquiring a spectrometry measurement for said spectrometry measurement position (Xi, Yj);
   e) reconstructing a spectrometry image (Pict) point by point, each point of the reconstructed spectrometry image (Pict) being obtained from one or several spectrometry measurements acquired at step d).

2. The method according to claim 1, wherein step b) comprises a step of decomposing the initial structural image (IM0) into wavelets, or a step of searching for outlines in the initial structural image (IM0) or a step of searching for forms in the initial structural image (IM0).

3. The method according to claim 2, wherein step b) comprises a step b1) of decomposing the initial structural image (IM0) into wavelets into a first, second, third and fourth components of order 1 (BL1, HL1, LH1, HH1), each component of order 1 (BL1, HL1, LH1, HH1) having a number of pixels equal to one quarter of the number of pixels of the initial structure image (IM0), the first component of order 1 representing the low spatial frequencies of the initial structural image (IM0), the second component of order 1 (HL1) representing the horizontal variations of the initial structure image (IM0), the third component of order 1 (LH1) representing the vertical variations of the initial structural image (IM0), and the fourth component of order 1 (HH1) representing the diagonal variations of the initial structural image (IM0), and a step of filtering the second, and respectively third, fourth, component of order 1 (HL1, LH1, HH1) by thresholding of the variations, to form a second, and respectively third, fourth, filtered component of order 1, step c) comprises a step c1) of determining a plurality of spectrometry measurement positions (Xi, Yj) in said area (4) of the sample, as a function of the values of the second, third and fourth filtered components of order 1 determined at step b1); and at step e), each point of the reconstructed spectrometry image (Pict) is obtained by a linear combination of the spectrometry measurements acquired at step d).

4. The method according to claim 3, comprising the following additional steps after step b1) of decomposing the initial structural image (IM0) into a first, second, third and fourth components (BL1, HL1, LH1, HH1) of order 1 and before step d) of spectrometry measurement and step e) of reconstruction, wherein steps bN) to cN) are iterated from 2 to N, and wherein steps dN) to eN) are iterated from N to 2, where N represents a natural integer higher than or equal to two and lower than or equal to m for an initial structural image (IM0) of $2^m \times 2^m$ pixels:

bN) decomposing the first component of order N−1 (BL[N−1]) into a first, second, third and fourth components of order N (BLN, HLN, LHN, HHN), the first component of order N (BLN) representing the low spatial frequencies of the first component of order N−1 (BL[N−1]), the second component of order N (HLN) representing the horizontal variations of the first component of order N−1(BL[N−1]), the third component of order N (LHN) representing the vertical variations of the first component of order N−1 (BL[N−1]) and the fourth component of order N (HHN) representing the diagonal variations of the first component of order N−1 (BL[N−1]), and filtering the second, and respectively third, fourth, component of order N (HLN, LHN, HHN) by thresholding, to form a second, and respectively third, fourth, filtered component of order N;

cN) determining a plurality of positions (X, Y) of spectrometry measurements of order N in said area (4) of the sample, as a function of the values of the first, second, third and fourth filtered image components of order N;

dN) for each spectrometry measurement position (Xi, Yj) of the plurality of positions of spectrometry measurements of order N determined at step cN), positioning the excitation beam to a position of spectrometry measurement (Xi, Yj) of order N and acquiring a spectrometry measurement for said position of spectrometry measurement (Xi, Yj) of order N;

eN) reconstructing a spectrometry image at order N−1, each point of the spectrometry image reconstructed at order N−1 being obtained by a linear combination of the spectrometry measurements acquired at step dN).

5. The method according to claim 4, wherein, at step b1), respectively bN), each pixel (BL1 (i, j), . . . , BLN(i, j)) of the first component of order 1, respectively of order N, is formed by averaging four adjacent pixels of the initial structural image (IM0), respectively by merging four adjacent pixels of the first component of order N−1, the four adjacent pixels being arranged on two lines and two columns of the initial structural image (IM0), respectively of the first component of order N−1.

6. The method according to claim 4, wherein step b), respectively bN), of filtering includes a step of resetting to zero the value of one pixel of said second, respectively third, fourth, component of order 1 (HL1, LH1, HH1), respectively of order N, when the value of said pixel is lower than or equal to a predetermined threshold value.

7. The method according to claim 1, comprising an additional step f), respectively fN), after step d), respectively dN), and before step e), respectively eN), wherein step f), respectively fN), comprises reconstructing a first, second, third and fourth decomposed spectrometry image of order 1, respectively of order N, said first, second, third and fourth decomposed spectrometry image of order 1, respectively of order N, having a number of points equal to the number of pixels of said first, second, third and fourth filtered decomposed structural image of order 1, respectively of order N, and wherein each pixel of null value of the second, respectively third, fourth, filtered decomposed structural image of order 1, respectively of order N, is associated with a point of null value of the second, respectively third, fourth, decomposed spectrometry image of order 1, respectively of order N, and wherein the values of the other points of the decomposed spectrometry images of order 1, respectively of order N, are calculated for each other point by a linear combination of at most four spectrometry measurements of order 1, respectively of order N, obtained at step d), respectively dN), and wherein step e), respectively eN), of reconstructing the spectrometry image (Pict), respectively of order N−1, includes a step of calculating by linear combinations the first, second, third and fourth decomposed spectrometry images of order 1, respectively of order N.

8. The method according to claim 4, wherein step d), respectively dN), comprises acquiring Raman or optical fluorescence or photoluminescence spectrometry measurements by laser beam scanning, and wherein step e), respectively eN), comprises the reconstruction of a Raman or optical fluorescence or photoluminescence spectrometry image.

9. The method according to claim 4, wherein step d), respectively dN), comprises acquiring Raman or optical fluorescence or photoluminescence spectrometry measurements by laser beam scanning, and wherein step e), respectively eN), comprises the reconstruction of a Raman or optical fluorescence or photoluminescence spectrometry image.

10. The method according to claim 1, wherein step a) comprises a step of detecting a structural image of the sample on an image sensor, or a step of recovering an image file of the sample on another metrology instrument or a step of downloading an image file from a data base comprising a structural image of the sample and/or a step of digitizing an analog structural image.

11. The method according to claim 1, wherein step a) further comprises a step of size increase or decrease, so that the size of the resized pixels corresponds to a maximum spatial resolution in the reconstructed spectrometry imaging (Pict).

\* \* \* \* \*